(12) United States Patent
Hucaluk et al.

(10) Patent No.: US 9,000,080 B2
(45) Date of Patent: Apr. 7, 2015

(54) METHOD FOR PRODUCING DRY GROUND CALCIUM CARBONATE FOR USE IN THERMOSET POLYESTER RESIN SYSTEMS

(75) Inventors: Brandon Keith Hucaluk, Allentown, PA (US); John Lawrence Finn, III, Etiwanda, CA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 361 days.

(21) Appl. No.: 13/289,006

(22) Filed: Nov. 4, 2011

(65) Prior Publication Data
US 2013/0116372 A1    May 9, 2013

(51) Int. Cl.
*C08K 3/26*    (2006.01)
*C08L 67/06*    (2006.01)

(52) U.S. Cl.
CPC .................................. *C08L 67/06* (2013.01)

(58) Field of Classification Search
USPC ................... 524/423, 425; 428/402
See application file for complete search history.

(56) References Cited

U.S. PATENT DOCUMENTS

| | | |
|---|---|---|
| 4,835,195 A | 5/1989 | Rayfield et al. |
| 5,015,295 A | 5/1991 | Lamond |
| 2004/0144509 A1* | 7/2004 | Mathur et al. ................. 162/135 |
| 2009/0170994 A1 | 7/2009 | McConnell et al. |
| 2010/0076139 A1 | 3/2010 | Mongoin et al. |

FOREIGN PATENT DOCUMENTS

WO    2005026252 A1    3/2005

* cited by examiner

*Primary Examiner* — Hannah Pak
(74) *Attorney, Agent, or Firm* — Leon Nigohosian, Jr.

(57) ABSTRACT

A dry ground calcium carbonate filler or additive made by dry grinding calcium carbonate in the presence of an organo-amine and then surface treating the ground calcium carbonate with a dispersant and the method of making the same is disclosed. Dry ground calcium carbonate filler or additive made by dry grinding calcium carbonate in the presence of an organo-amine such as triethanolamine and then surface treating the ground calcium carbonate with a dispersant such as sodium polyacrylate when added to a polyester polymer composition yields a lower viscosity of the polymer system than without the addition of triethanolamine followed by surface treating the ground calcium carbonate with a dispersant.

10 Claims, 5 Drawing Sheets

METHOD FOR PRODUCING DRY GROUND CALCIUM CARBONATE FOR USE IN THERMOSET POLYESTER RESIN SYSTEMS

FIELD OF THE INVENTION

The present invention relates to mineral fillers/additives for polymers.

BACKGROUND OF THE INVENTION

Ground calcium carbonate (GCC) is a mineral filler or additive for polymer resins. Some of the techniques for making polyester articles having mineral fillers and additives are sheet molding compounds (SMC) and bulk molding compounds (BMC). For example, in SMC applications a polymeric sheet containing mineral additives is produced and then is placed into a mold. The polymeric sheet flows to fill the mold cavity with temperature and pressure and is cured in place. In order to produce a fully formed article, a low resin viscosity with good flow properties is needed to ensure the mold cavity is completely filled prior to the resin system curing. Also, articles such as cultured marble formed from polyester resins having mineral fillers and additives can be made.

SUMMARY

According to an embodiment of the present invention, a method of making a dry ground calcium carbonate filler or additive by dry grinding calcium carbonate in the presence of triethanolamine (TEA) and then surface treating the ground calcium carbonate with a dispersant is disclosed.

According to another embodiment, a dry ground calcium carbonate filler or additive made by dry grinding calcium carbonate in the presence of triethanolamine and then surface treating the ground calcium carbonate with a dispersant is disclosed.

According to another embodiment, a thermosetting polyester polymer composition comprising a polyester resin and dry ground calcium carbonate filler or additive made by dry grinding calcium carbonate in the presence of triethanolamine and then surface treating the ground calcium carbonate with a dispersant is disclosed.

According to another embodiment, an article comprising a thermosetting polyester polymer composition comprising a polyester resin and dry ground calcium carbonate filler or additive made by dry grinding calcium carbonate in the presence of triethanolamine and then surface treating the ground calcium carbonate with a dispersant is disclosed.

DETAILED DESCRIPTION OF THE INVENTION

Without further elaboration, it is believed that one skilled in the art can, using the preceding description, utilize the present invention to its fullest extent. The following embodiments are, therefore, to be construed as merely illustrative, and not limitative of the remainder of the disclosure in any way whatsoever.

The invention will now be described in detail by reference to the following specification and non-limiting examples. Unless otherwise specified, all percentages are by weight and all temperatures are in degrees Fahrenheit.

According to an embodiment of the present invention, a method of making a dry ground calcium carbonate filler or additive by dry grinding ground calcium carbonate in the presence of triethanolamine and then surface treating the ground calcium carbonate with a dispersant is disclosed. The resulting dry ground calcium carbonate can be used in thermosetting polyester resin systems to provide a thermosetting polyester resin or polymer with desirable flow properties. The viscosity of the resulting thermosetting polyester resin systems can be such that it is suitable for use in SMC (sheet molding compound) and BMC (bulk molding compound) techniques.

Sample preparation is carried out by adding Resin A, Resin B, and Resin C as described in Table 1 to a de-rimmed one quart paint can. The ground calcium carbonate (GCC) filler is weighed out onto a weighing pan. The one quart paint can is placed under a two and a half inch Cowles saw tooth blade and the blade is lowered into the resin. One half of the GCC filler is added to the resin and dispersed at 2500 rpm. After the material is fully incorporated into the resin (wetted-out), the Cowles disperser is stopped and the remaining GCC filler is added. The Cowles disperser is started and the remaining powder is incorporated. The resultant paste is dispersed to a temperature of 90° F. at which time the Cowles disperser blade is lifted and stopped. The paste is immediately transferred to a one half pint de-rimmed paint can for viscosity measurement.

The viscosity is measured using a Brookfield Viscometer, model RVT with a number six spindle at 20 revolutions per minute and 90 degrees Fahrenheit. The viscosity is recorded after forty-five seconds of rotational spin.

Figure 1:
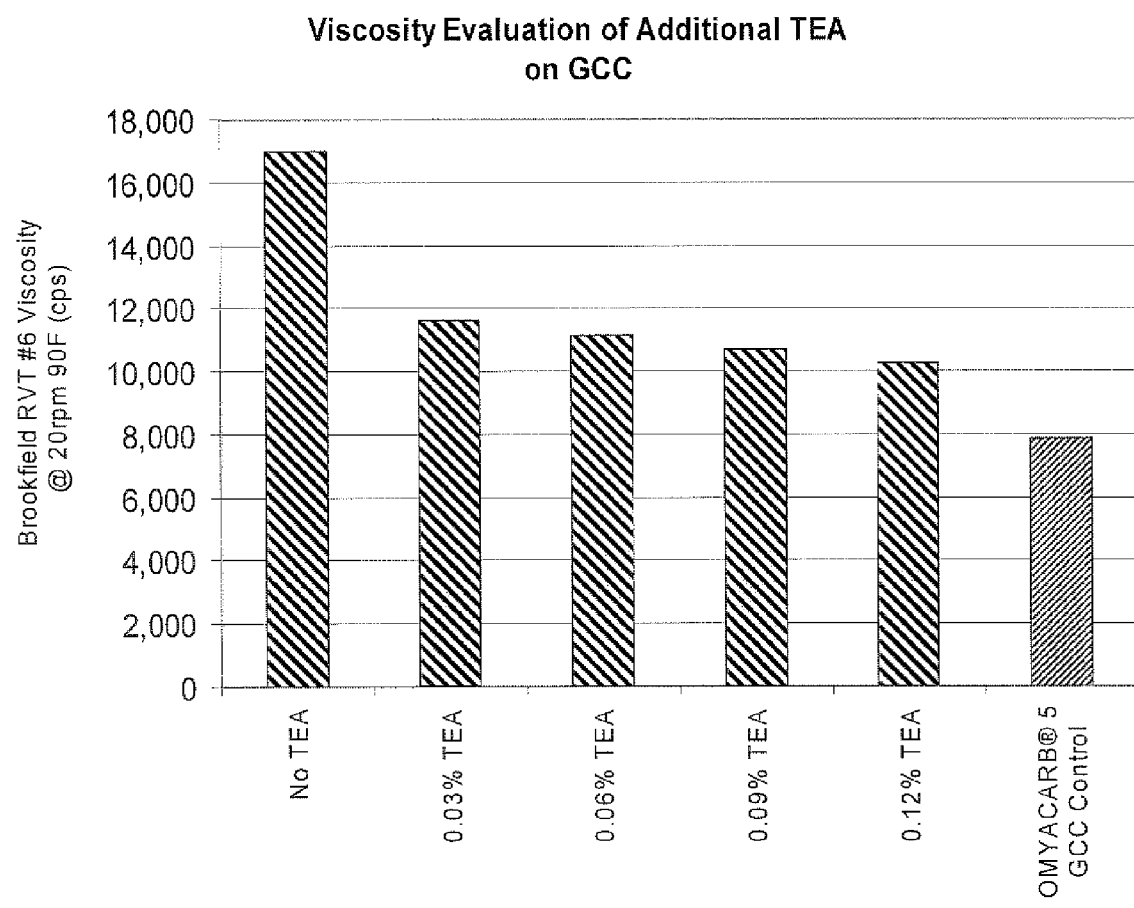
FIG. 1 is a chart showing the correlation between the viscosity of polyester resin having ground calcium carbonate without dry grinding in the presence of triethanolamine (TEA) and with varying levels of triethanolamine surface treatment.

As seen in FIG. 1, in a first experiment by the inventors using the polyester resin formulation described in Table 1 without an inorganic flame retardant, dry ground calcium carbonate which has been treated with the grinding aid triethanolamine, did not provide a suitable viscosity for use in thermosetting polyester resin systems as compared to the control sample which is OMYACARB® 5 ground calcium carbonate from OMYA Inc. North America. Table 2 shows the correlation between the amount of triethanolamine used as a grinding aid for ground calcium carbonate and the viscosity of a thermosetting polyester resin system having the aforementioned surface treated ground calcium carbonate as a filler. The ground calcium carbonate surface treated with the triethanolamine was Vicron® 31-6 ground calcium carbonate available from Specialty Minerals Inc. of Bethlehem, Pa. The components of the thermosetting polyester resin used for the evaluation seen in FIG. 1 are shown below in Table 1.

TABLE 1

Resin Formulation

| Polyester Resin Component | Percent | Weight (g) |
|---|---|---|
| Resin A: Unsaturated Polyester Resin | 23.34 | 175.0 |
| Resin B: Low-Profile Additive | 11.44 | 85.82 |
| Resin C: Wetting and Dispersing Additive | 0.87 | 6.53 |
| Ground Calcium Carbonate | 64.35 | 482.88 |
| Total | 100.00 | 750.23 |

TABLE 2

Viscosity Evaluation of Increasing amounts of TEA Grinding Aid

| Weight Percent of TEA | Brookfield Viscosity (cps) |
|---|---|
| 0 | 17,000 |
| 0.03 | 11,600 |
| 0.06 | 11,150 |
| 0.09 | 10,700 |
| 0.12 | 10,250 |
| OMYACARB ® 5 GCC Control | 7,850 |

TABLE 3

Resin Formulation with Inorganic Fire Retardant

| Polyester Resin Component | Percent | Weight (g) |
|---|---|---|
| Resin A: Unsaturated Polyester Resin | 22.66 | 169.95 |
| Resin B: Low-Profile Additive | 12.20 | 91.5 |
| Resin C: Wetting and Dispersing Additive | 0.66 | 4.95 |
| Ground Calcium Carbonate | 55.77 | 418.28 |
| Inorganic Fire Retardant | 8.71 | 65.33 |
| Total | 100.00 | 750.00 |

For the remaining experiments, sample preparation is carried out by adding Resin A, Resin B, and Resin C as described in Table 3 to a de-rimmed one quart paint can. The ground calcium carbonate (GCC) filler and inorganic flame retardant is weighed out onto a weighing pan. The one quart paint can is placed under a two and a half inch Cowles saw tooth blade and the blade is lowered into the resin. One half of the GCC filler and inorganic flame retardant is added to the resin and dispersed at 2500 rpm. After the material is wetted-out, the Cowles disperser is stopped and the remaining GCC filler and inorganic flame retardant is added. The Cowles disperser is started and the remaining powder is incorporated into the resin. The resultant paste is dispersed to a temperature of 90° F. at which time the Cowles disperser blade is lifted and stopped. The paste is immediately transferred to a one half pint de-rimmed paint can for viscosity measurement.

The viscosity is measured using a Brookfield Viscometer, model RVT with a number six spindle at 20 revolutions per minute and 90 degrees Fahrenheit. The viscosity is recorded after forty-five seconds of rotational spin.

Figure 2:
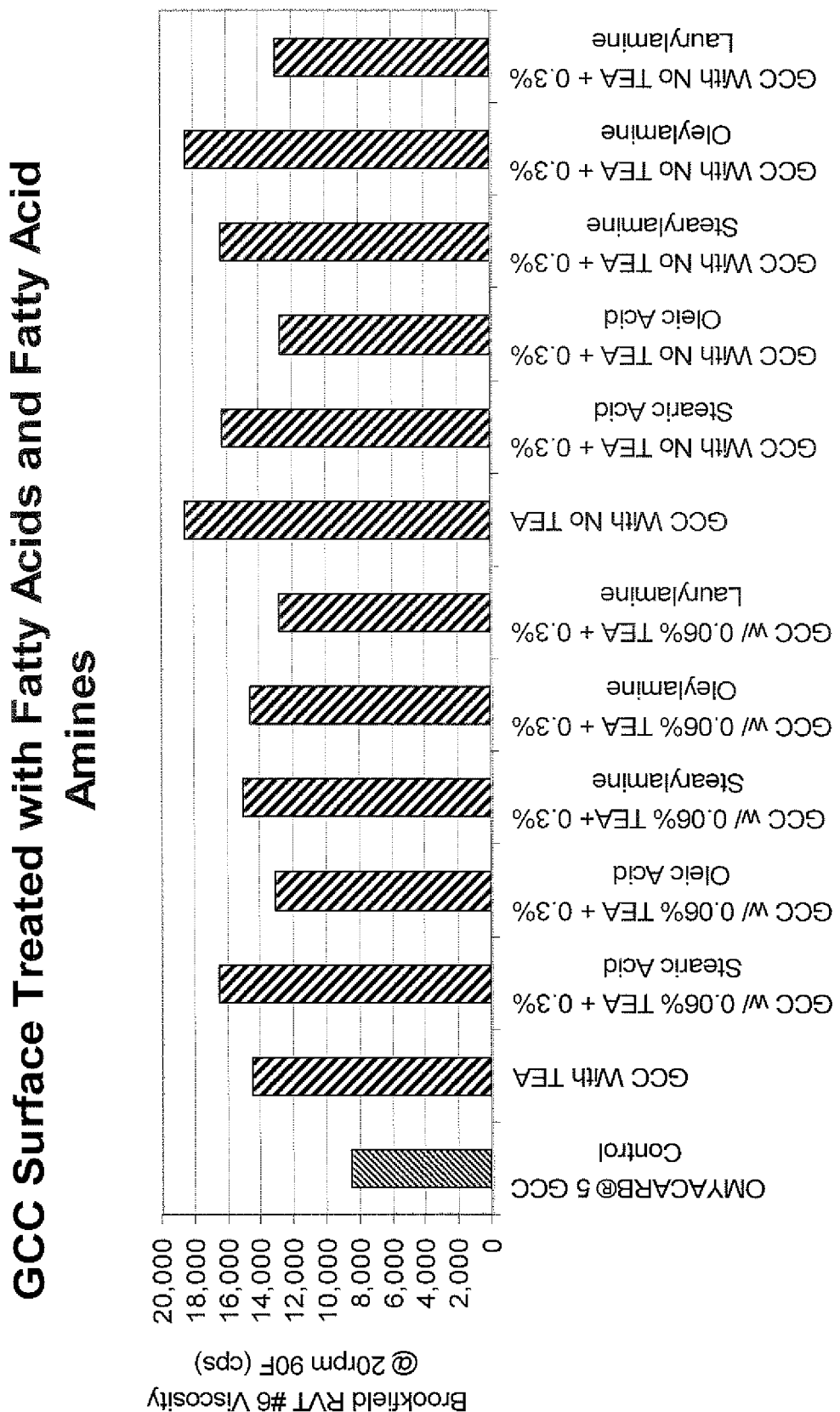
FIG. 2 is a chart showing the viscosity of polyester resin having ground calcium carbonate surface treated with either a fatty acid or a fatty acid amine both with and without triethanolamine.

As seen in FIG. 2, in a second experiment by the inventors using the formulation described in Table 3, dry ground calcium carbonate which has been treated with either a fatty acid or a fatty acid amine both with and without the grinding aid triethanolamine was studied.

All of the formulations depicted in FIG. 2 did not provide a suitable viscosity for use in thermosetting polyester resin systems as compared to the control sample which is OMYACARB® 5 ground calcium carbonate. Table 4 shows the viscosity of a thermosetting polyester resin system having the aforementioned surface treated ground calcium carbonate added to the formulation. In the samples of Table 4, the fatty acid or fatty acid amine was present in an amount of 0.3 weight percent of the ground calcium carbonate. Where it is indicated in Table 4 that triethanolamine (TEA) is present, the amount present was 0.06 weight percent TEA.

Figure 3:
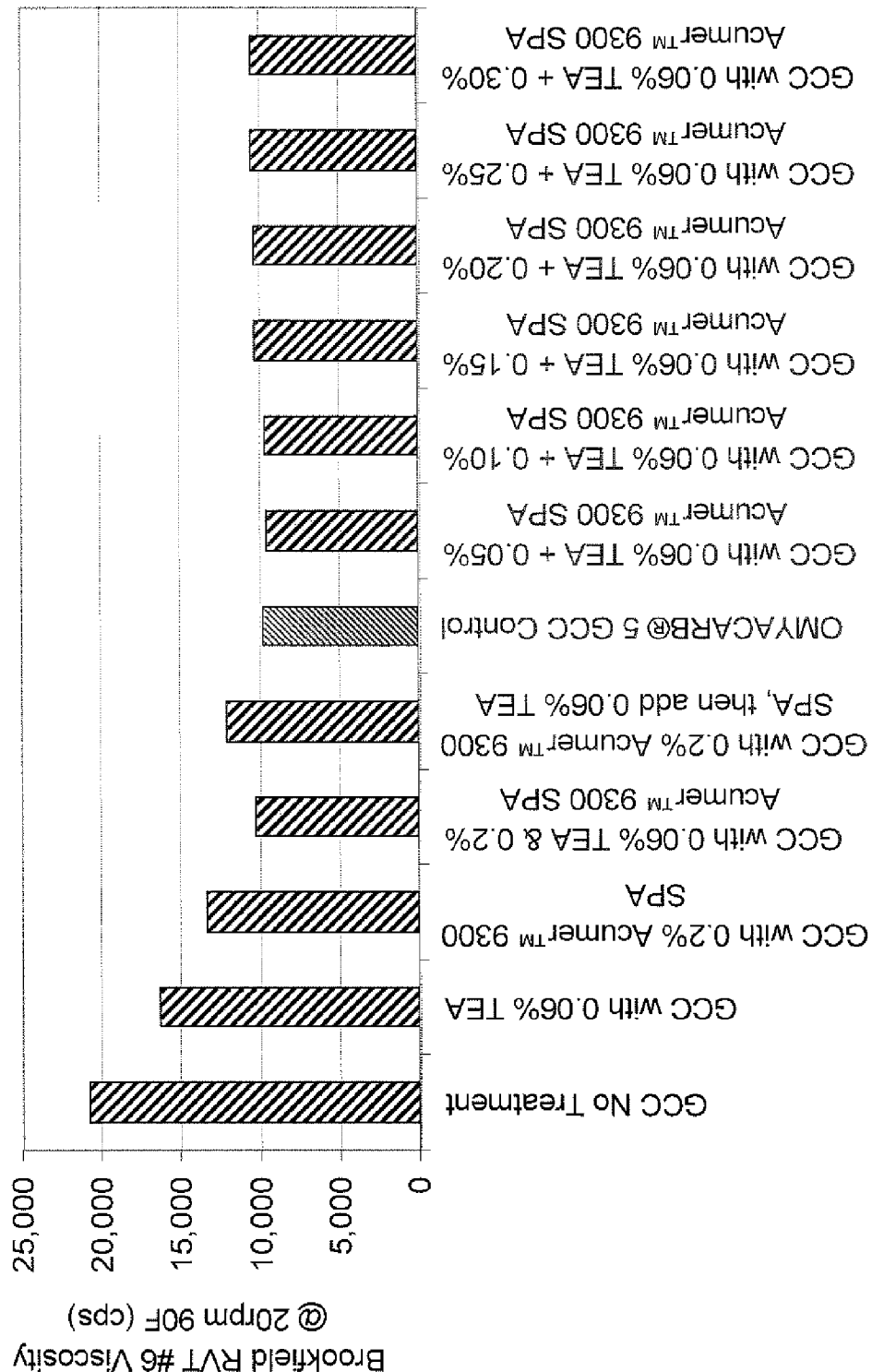
FIG. 3 is a chart showing the viscosity of polyester resin having ground calcium carbonate surface treated with triethanolamine and a sodium polyacrylate (SPA) dispersant in various orders of addition and surface treated with triethanolamine and a varying amount of dispersant.

As seen in the first five samples of FIG. 3 showing the viscosity of thermosetting polyester resin comprising ground calcium carbonate, dry ground calcium carbonate was treated using a variety of combinations including with and without triethanolamine. The last six experimental samples in FIG. 3 show the same dry ground calcium carbonate treated with triethanolamine and a dispersant in various concentrations. Acumer™ 9300 sodium polyacrylate (SPA) was the dispersant which is available from Dow Chemical Company. Only one of the five experimental samples depicted on the left side of the chart in FIG. 3 provided a suitable viscosity for use in thermosetting polyester resin systems as compared to the control sample which is OMYACARB® 5 ground calcium carbonate. The sample comprises the inventors' formulation wherein Vicron® 31-6 GCC was treated with triethanolamine as a grinding aid and then surface treated with a dispersant, here Acumer™ 9300 sodium polyacrylate which is forty five percent active.

TABLE 4

| DESCRIPTION | Brookfield Viscosity (cps) |
|---|---|
| OMYACARB ® 5 GCC Control | 8,500 |
| Vicron ® 31-6 GCC With 0.06 wt. % TEA | 14,500 |
| Vicron ® 31-6 GCC With 0.06 wt. % TEA + 0.3 wt. % Stearic Acid | 16,500 |
| Vicron ® 31-6 GCC With 0.06 wt. % TEA + 0.3 wt. % Oleic Acid | 13,100 |
| Vicron ® 31-6 GCC With 0.06 wt. % TEA + 0.3 wt. % Stearylamine | 15,000 |
| Vicron ® 31-6 GCC With 0.06 wt. % TEA + 0.3 wt. % Oleylamine | 14,600 |
| Vicron ® 31-6 GCC With 0.06 wt. % TEA + 0.3 wt. % Laurylamine | 12,850 |
| Vicron ® 31-6 GCC With No TEA | 18,500 |
| Vicron ® 31-6 GCC With No TEA + 0.3 wt. % Stearic Acid | 16,250 |
| Vicron ® 31-6 GCC With No TEA + 0.3 wt. % Oleic Acid | 12,750 |
| Vicron ® 31-6 GCC With No TEA + 0.3 wt. % Stearylamine | 16,300 |
| Vicron ® 31-6 GCC With No TEA + 0.3 wt. % Oleylamine | 18,400 |
| Vicron ® 31-6 GCC With No TEA + 0.3 wt. % Laurylamine | 13,000 |

That sample provided a viscosity of 10,250 cps as seen in Table 5 below. The sample which was produced by first surface coating or surface treating the Vicron® 31-6 GCC with 0.2 wt. percent Acumer™ 9300 sodium polyacrylate (SPA) and then surface treating resulting ground calcium carbonate with 0.06 weight percent triethanolamine provided a viscosity of 12,100 cps. This shows that the order of addition of the grinding aid and dispersant is critical to achieving the desired lower polyester viscosity.

As can be seen in Table 5 and FIG. 3, a desired lower viscosity of thermosetting resin containing ground calcium carbonate is provided when the ground calcium carbonate is first treated with triethanolamine and then surface treated with a dispersant such as Acumer™ 9300 sodium polyacrylate.

Further, a ladder study of increasing dispersant concentrations was performed as seen in FIG. 3 and Table 5 to determine the potential amounts of dispersant added after the treatment with triethanolamine which would yield an acceptable viscosity of the thermosetting polyester resin system having ground calcium carbonate. All of the Acumer™ 9300 dispersant levels examined in this study produced acceptable viscosity results. The concentrations used for this study were 0.05 to 0.30 weight percent Acumer™ 9300 sodium polyacrylate.

Figure 4:
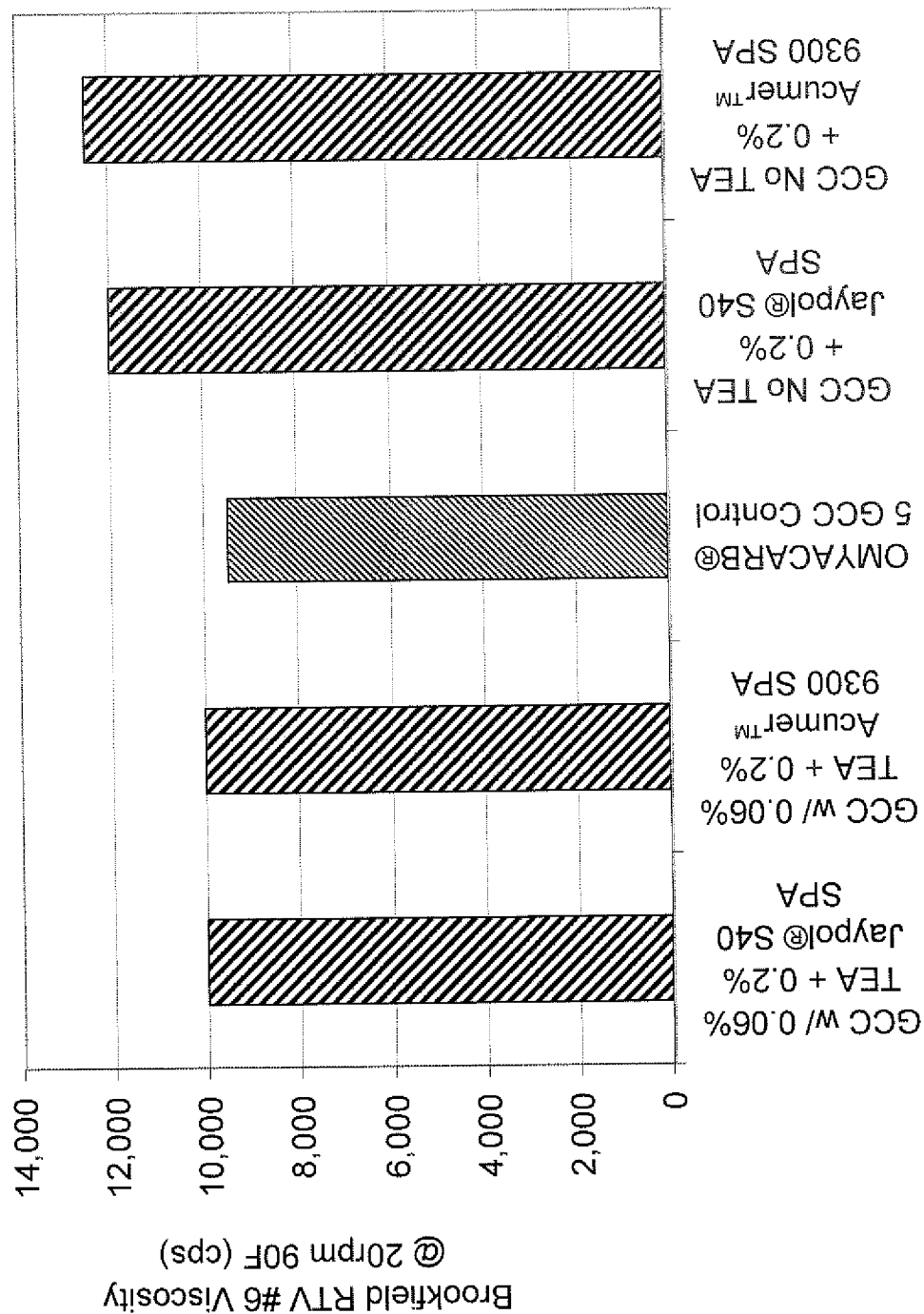
FIG. 4 is a chart showing the viscosity of polyester resin having ground calcium carbonate surface treated with two different types of dispersant both with and without triethanolamine.

In some embodiments of the invention, dispersants other than Acumer™ 9300 dispersant can be used. For example, as seen in FIG. 4 and Table 6 below, the ground calcium carbonate which has been treated with triethanolamine was then treated with 0.2 weight percent Jaypol® S40 sodium polyacrylate dispersant available from International Specialty Products Inc. of Ashland Inc. A desired lower viscosity of 10,000 cps thermosetting resin containing ground calcium carbonate is provided when the Vicron® 31-6 ground calcium carbonate is first treated with 0.06 weight percent triethanolamine and then surface treated with 0.1 weight percent Jaypol® S40 sodium polyacrylate dispersant. When the ground calcium carbonate was not pretreated with TEA and only treated with sodium polyacrylate the desired lower viscosity was not achieved.

TABLE 5

| DESCRIPTION | Brookfield Viscosity (cps) |
| --- | --- |
| Vicron ® 31-6 GCC with no Treatment | 20,800 |
| Vicron ® 31-6 GCC with 0.06 wt. % TEA | 16,300 |
| Vicron ® 31-6 GCC with no TEA and 0.2 wt % Acumer ™ 9300 SPA | 13,400 |
| Vicron ® 31-6 GCC first with 0.06 wt. % TEA mixed for 5 min, then 0.2 wt % Acumer ™ 9300 SPA added | 10,250 |
| Vicron ® 31-6 GCC first with 0.2 wt % Acumer ™ 9300 SPA mixed for 5 min then 0.06 wt. % TEA added | 12,100 |
| Vicron ® 31-6 GCC with a premix of 0.2 wt % Acumer ™ 9300 SPA and 0.06 wt. % TEA added simultaneously | 14,750 |
| OMYACARB ® 5 GCC Control | 9,750 |
| Vicron ® 31-6 GCC with 0.06 wt % TEA, and then add 0.05 wt. % Acumer ™ 9300 SPA | 9,500 |
| Vicron ® 31-6 GCC with 0.06 wt % TEA, and then add 0.10 wt. % Acumer ™ 9300 SPA | 9,650 |
| Vicron ® 31-6 GCC with 0.06 wt % TEA and then add 0.15 wt. % Acumer ™ 9300 SPA | 10,250 |
| Vicron ® 31-6 GCC with 0.06 wt % TEA, and then add 0.20 wt. % Acumer ™ 9300 SPA | 10,250 |
| Vicron ® 31-6 GCC with 0.06 wt % TEA, and then add 0.25 wt. % Acumer ™ 9300 SPA | 10,500 |
| Vicron ® 31-6 GCC with 0.06 wt % TEA, and then add 0.30 wt. % Acumer ™ 9300 SPA | 10,450 |

TABLE 6

| DESCRIPTION | Brookfield Viscosity (cps) |
| --- | --- |
| Vicron ® 31-6 GCC with 0.06 wt. % TEA + 0.2% Jaypol ® S40 SPA | 10,000 |
| Vicron ® 31-6 GCC with 0.06 wt. % TEA + 0.2% Acumer ™ 9300 SPA | 10,000 |
| OMYACARB ® 5 GCC Control | 9,500 |

TABLE 6-continued

| DESCRIPTION | Brookfield Viscosity (cps) |
| --- | --- |
| Vicron ® 31-6 GCC No TEA + 0.2% Jaypol ® S40 SPA | 12,000 |
| Vicron ® 31-6 GCC No TEA + 0.2% Acumer ™ 9300 SPA | 12,500 |

Figure 5:
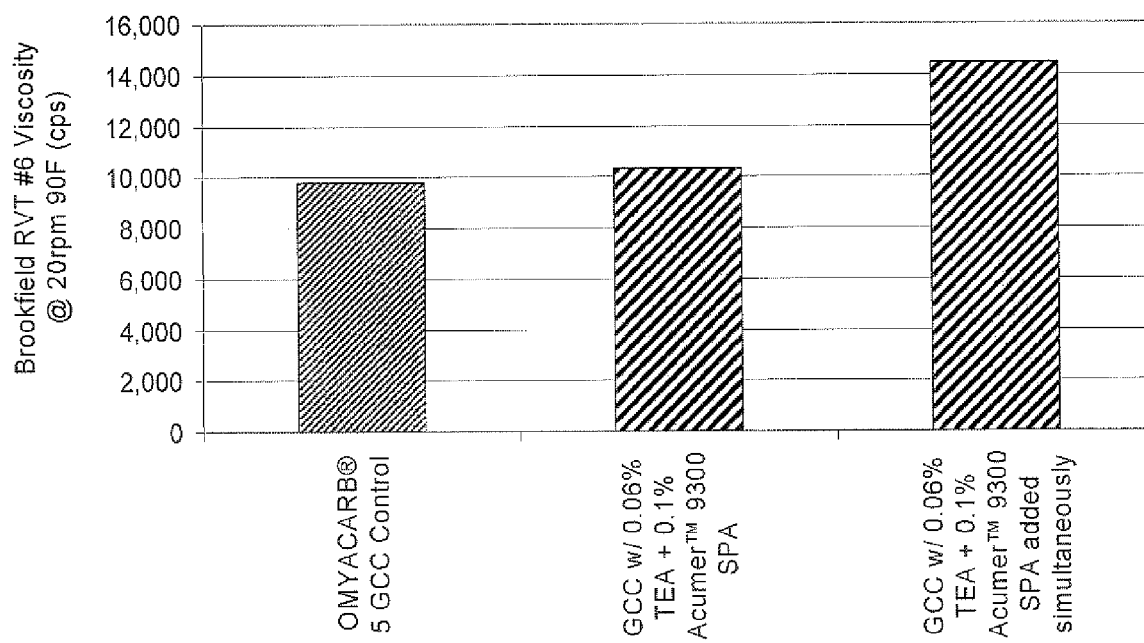
FIG. 5 is a chart showing the viscosity of polyester resin having ground calcium carbonate surface treated with triethanolamine and then a dispersant and also showing surface treating with triethanolamine simultaneously with the dispersant.

As seen in FIG. 5 and Table 7, the inventors produced a sample of thermosetting polyester resin having ground calcium carbonate which has been treated with 0.06 weight percent triethanolamine and was then treated with 0.1 weight percent Acumer™ 9300 dispersant and the viscosity of the resulting thermosetting polyester resin was 10,300 cps. As seen in Table 7, simultaneously adding TEA and sodium polyacrylate to the dry ground calcium carbonate resulted in a significantly higher viscosity of 14,450 cps.

TABLE 7

| DESCRIPTION | Brookfield Viscosity (cps) |
| --- | --- |
| OMYACARB ® 5 GCC Control | 9,800 |
| Vicron ® 31-6 GCC with 0.06 wt % TEA + 0.1% Acumer ™ 9300 SPA | 10,300 |
| 0.06 wt. % TEA + Acumer ™ 9300 SPA added simultaneously | 14,450 |

Based on these studies the dispersant is preferably but not limited to polycarboxylate based homo and co-polymers such as acrylic based polymers, polyacrylamides, polysulfonates, polysulfates, polyphosphates, polyphosphonates polymers or copolymers thereof with or without hydrocarbon containing polymers or co-polymers and also in the form of an acid, ester, salt, or any combination thereof having a molecular weight range of one thousand to twenty thousand atomic mass units.

Preferably, the dispersant is present in an amount of 0.01 to 1.0 weight percent of the ground calcium carbonate. Also preferably, the dispersant is present in an amount of 0.01 to 0.5 weight percent of the ground calcium carbonate. In another embodiment, the dispersant is present in an amount of 0.01 to 0.20 weight percent.

Dry grinding of calcium carbonate means that the grinding process is carried out in the presence of ten percent or less water. The calcium carbonate can be ground autogenously, that is, by direct contact between the particles themselves or in the presence of a grinding material which is different than the dry ground calcium carbonate. The dry grinding of calcium carbonate can take place in a variety of different milling technologies such as a media mill.

The grinding aid can be an organo-amine such as triethanolamine or a methanol, ethanol, propanol, or butanol amine or any combination thereof as a primary, secondary or tertiary amine. Preferably, the amine is present in an amount of 0.01 to 2.0 wt percent. Also preferred is that the amine is present in an amount of 0.04 to 1.0 weight percent.

Surface treating the dry ground calcium carbonate with triethanolamine followed by surface treatment with a dispersant according to the method of the present disclosure has resulted in an unexpected decrease in the resulting viscosity of a thermosetting polyester resin system comprising the dry ground calcium carbonate.

Accordingly, it is understood that the above description of the present invention is susceptible to considerable modifications, changes and adaptations by those skilled in the art, and that such modifications, changes and adaptations are intended to be considered within the scope of the present invention.

We claim:

1. A polymeric composition comprising:
a thermosetting polyester component, and
a dry ground calcium carbonate made by dry grinding calcium carbonate in the presence of an organo-amine and then surface treating the ground calcium carbonate with a dispersant polymer,
wherein the dispersant is a polymer having a molecular weight range of between one thousand to twenty thousand atomic mass units,
wherein the dispersant polymer is selected from the group consisting of acrylic based homopolymers, acrylic based polymers, polyacrylamides, polyphosphates, and polyphosphonates, in the form of a hompolymer, copolymer, an acid, ester, or salt thereof, and combinations thereof, and is present in an amount of 0.01 to 0.5 weight percent of the ground calcium carbonate; and
wherein the organo-amine is a primary, secondary or tertiary methanolamine, ethanolamine, propanolamine or butanolamine, or any combination thereof, and is present in an amount of 0.01 to 2.0 weight percent of the ground calcium carbonate.

2. The polymeric composition of claim 1 wherein the polymeric composition further comprises dispersant polymer having hydrocarbon containing polymers or hydrocarbon containing copolymers.

3. The polymeric composition of claim 1 wherein the dispersant polymer is a sodium polyacrylate.

4. The polymeric composition of claim 3 wherein the dispersant polymer is present in an amount of 0.01 to 0.20 weight percent of the ground calcium carbonate.

5. The polymeric composition of claim 1 wherein the organo-amine is triethanolamine.

6. The polymeric composition of claim 1 wherein the organo-amine is triethanolamine and wherein the triethanolamine is present in an amount of 0.04 to 1.0 weight percent of the ground calcium carbonate.

7. The polymeric composition of claim 1 wherein the organo-amine is triethanolamine and wherein the triethanolamine is present in an amount of 0.04 to 0.5 weight percent of the ground calcium carbonate.

8. The polymeric composition of claim 5 wherein the dispersant is sodium polyacrylate present in an amount of 0.01 to 0.2 weight percent of the ground calcium carbonate and the triethanolamine is present in an amount of 0.04 to 0.5 weight percent of the ground calcium carbonate.

9. An article comprising the polymeric composition of claim 1 made by sheet molding compound or bulk molding compound techniques.

10. A method of reducing the viscosity of a thermosetting polyester resin composition having ground calcium carbonate additive comprising the steps of:
providing a thermosetting polyester component, and
compounding into the thermosetting polyester component a dry ground calcium carbonate made by dry grinding the ground calcium carbonate in the presence of an organo-amine and then surface treating the ground calcium carbonate with a dispersant polymer;
wherein the dispersant polymer is a polymer having a molecular weight range of between one thousand to twenty thousand atomic mass units,
wherein the polymer is selected from the group consisting of acrylic based homopolymers, acrylic based polymers, polyacrylamides, polyphosphates, and polyphosphonates, in the form of a hompolymer, copolymer, an acid, ester, or salt thereof, and combinations thereof, and is present in an amount of 0.01 to 0.5 weight percent of the ground calcium carbonate; and
wherein the organo-amine is a primary, secondary or tertiary methanolamine, ethanolamine, propanolamine or butanolamine, or any combination thereof, and is present in an amount of 0.01 to 2.0 weight percent of the ground calcium carbonate.

* * * * *